April 3, 1956  W. C. WALLER  2,740,253
CHAIN LINK COUPLING OF S-FORM
Filed Oct. 5, 1951
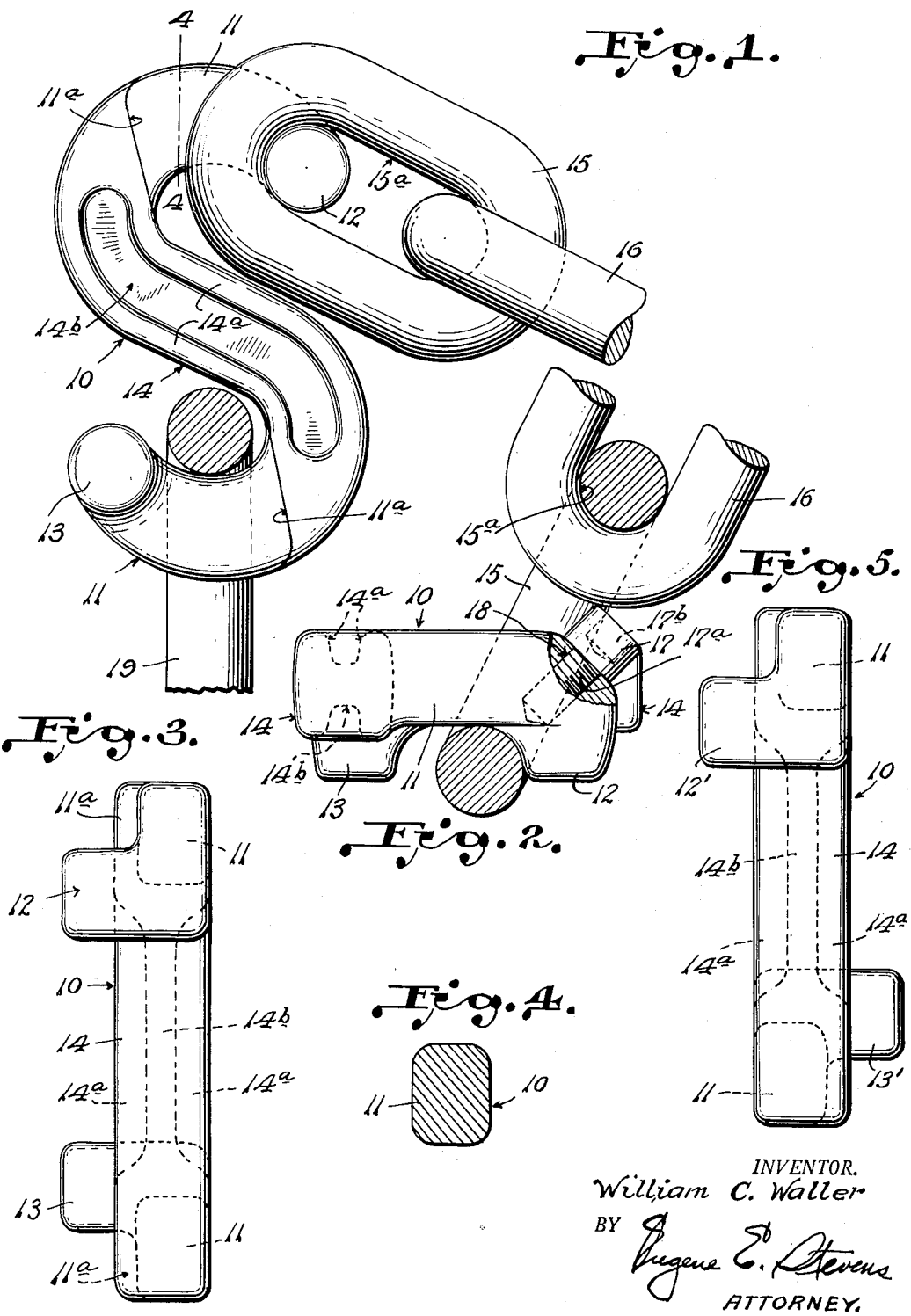
INVENTOR.
William C. Waller
BY Eugene E. Stevens
ATTORNEY.

United States Patent Office 2,740,253
Patented Apr. 3, 1956

2,740,253

CHAIN LINK COUPLING OF S-FORM

William C. Waller, Sherman Oaks, Calif., assignor of one-half to William K. Robbins, Milwaukee, Wis.

Application October 5, 1951, Serial No. 249,980

4 Claims. (Cl. 59—85)

My invention relates to chain link couplings and while it may be employed as a repair link, it is primarily intended for use as a general utility chain link connector, as for instance for automobile tow chains, kiln chains in cement plants, buoy chain connectors, and in fact practically all load sustaining chains.

Briefly and generally stated the invention has for its primary object to provide a chain link connector or coupling which incorporates novel means for preventing disengagement of same from an adjacent chain link except when said coupling and adjacent link are in a single adjusted relationship which is not one which the parts can assume while in service.

Additionally, the invention contemplates a device as characterized in the preceding paragraph and which employs a removable element for positively preventing disengagement of the coupling or connector from an adjacent chain link regardless of the relative positions of same, such removable element being employed particularly when the connector is applied to a material handling chain which is sometimes dropped in a "pile" and thus apt to position the coupling and adjacent link in a relative arrangement which would enable the two to be separated.

Additionally, the invention contemplates a chain link coupling of generally S form and provides novelly arranged chain link retaining means at the terminals of each of its hooked portions, and which retaining means may project from the same or opposite faces of the coupling.

Still further, the invention aims to provide a novel S form chain link coupling which embodies novel reinforcing means between the hooked ends and which means confines a chain link to the region of said hooked ends.

Other objects and advantages of the invention will be understood and appreciated by those skilled in the art from a reading of the following descriptive matter in connection with the accompanying drawing which illustrates a now preferred example of my inventive concept.

In the drawing, wherein the same reference characters have been used to designate the same parts throughout the several views—

Fig. 1 is a side elevational view of my novel chain link coupling, illustrating the position which an adjacent chain link assumes while being applied to or removed from the coupling;

Fig. 2 is a top plan view of the parts shown in Fig. 1, but with the adjacent chain link which is being applied to the coupling shown in longitudinal section, and swung rearwardly slightly;

Fig. 3 is an edge elevational view of the novel chain link coupling shown in Figs. 1 and 2;

Fig. 4 is a cross-sectional view taken on the line 4—4 of Fig. 1; and

Fig. 5 is a view similar to Fig. 3, but showing a modified form of the invention in which the chain link retaining lugs project from opposite faces of the coupling instead of from the same face as in Fig. 3.

Referring to the drawing by reference characters, Fig. 1 discloses the coupling as being generally S form and designated by reference character 10.

Figs. 2, 3 and 4 disclose the chain link seating terminals 11 of the coupling 10 as being of reduced cross section as compared to the intervening compoundly curved body portion 14 of the coupling, and the outer ends of the link sustaining hooked portions 11 terminate in laterally projecting top and bottom lugs 12, 13.

Figs. 1 and 3 show that the body portion 14 of the coupling provides a shoulder 11a at the inner end of each hook sustaining portion 11 for preventing passage of an adjacent chain link such as 15 onto the body portion 14 of the coupling.

In carrying out the invention in its illustrated form, the body portion 14 of the coupling has its intermediate major portion of I cross section providing the inner and outer flanges 14a and the intervening web portion 14b.

The mode of assembly or connection of the coupling to an adjacent chain link 15 is illustrated in Figs. 1 and 2, the latter view also showing a second link 16 which is carried by the chain link 15.

To establish connection with the chain link 15 the latter is placed over the stud 12 and with its longitudinal recess 15a lying in substantial prolongation of the adjacent link sustaining hook portion 11 of the coupling. Having positioned the link and coupling 15, 10 as shown in Fig. 1, the link 15 is then rocked counter-clockwise as viewed in Fig. 2 to the dotted line position in said figure.

Fig. 2 shows that during the operation of establishing connection between the end 12, 11 of the coupling and the chain link 15 the inner end of the latter nests snugly against the inner curve of the lug portion 12, and that the second link 16 is pulled up against the remote end of the first link 15. In this position as shown in Fig. 2, the distance between the inner end of the elongated opening 15a of the link 15 to the outer end of the adjacent link 16 is just sufficient to allow the outer corner of the coupling portion 11, 12 to clear when the link 15 is swung further to the right (Fig. 2). After the connection has been made as above described the coupling 10 is allowed to drop to the Fig. 1 position along with the previously connected link 19.

If the chain in which the coupling 14 is used is employed for loading or other purposes where it may be dropped in a pile, it is deemed desirable to apply the socket screw 17 to the tapped bore 18, said screw having its head 17a provided with a socket 17b for the application of a tool when applying or removing the screw. The screw 17 when positioned has its head jutting out sufficiently far to prevent the link 15 from being moved in a clockwise direction past the screw head 17a (see Fig. 2).

However, when the chain to which the coupling is applied is normally kept drawn out in service as it would be when used as a tow chain or as a kiln chain in a cement plant, employment of the retaining screw 17 is really not necessary. Coupling 10 cannot disengage even in a very slack chain because of the impossibility of link 15 (or 19) and coupling 10 assuming the relative positions for separation which are shown in Figs. 1 and 2.

Fabrication of the coupling is facilitated by having the lugs 12, 13 project from the same face of the coupling as illustrated in Fig. 1. However, in order to better prevent undesired separation of the links 15, 19 from the coupling it is preferable that the lugs 12, 13 project from opposite faces of the coupling 14, as illustrated in Fig. 5.

Turning to the modified form of the invention shown in Fig. 5, it will be noted that the lugs 12', 13' project from opposite faces of the coupling which is otherwise identical to the coupling illustrated in Figs. 1, 2 and 3.

Having thus described my invention, what I claim is:

1. In a chain gap, providing gap-defining links and adjacent links having side limbs and an intervening opening of predetermined size, a link coupling comprising an S form body providing chain link sustaining hooks at opposite ends, and a common shank portion therebetween, each hook providing a bill which is spaced from the related and opposed shank portion a distance substantially corresponding to the thickness of the adjacent link limb, a lug adjacent the outer terminal of each hook bill and extending in a direction substantially perpendicular to the plane of said S-form body, the length of each lug plus the thickness of its hook in said direction exceeding the width of the related chain link openings whereby to prevent separation of the coupling and connected links in service, an outwardly projecting shoulder substantially normal to the plane of said body and separating the link load supporting portion of each hook from the adjacent shank portion, the hook shank-providing portion of said S-form body between said shoulders being of greater thickness in said aforementioned direction than is the same dimension of said hooks and greater than the width of the chain link openings whereby to prevent the passage of chain links onto the shank portion of said body, the thickness of each of said hooks in the plane of said body exceeding the width of said link openings from the adjacent shoulder to a point adjacent the bill-carried stud, so as to prevent transverse rocking of a terminal link on its hook bill until it is adjacent the stud, and the transverse thickness of each stud and the thickness of the adjacent hook bill portions in the plane of said S-form body not exceeding the width of the link opening, whereby each terminal chain link can be engaged with the adjacent stud and rocked in a plane normal to the plane of said body so as to pass onto the adjacent hook bill.

2. The combination set forth in claim 1, and each stud and the adjacent hook bill at the side of the lug which is remote from the bill end providing thickened and merging outwardly tapering portions constituting a link seat in which the related terminal link engages in the event that the hooks bend under a predetermined excess load whereby the stud and hook bill-provided load sustaining capacity of the hooks at the site of said seats in the direction of load under such condition exceeds the load sustaining capacity of other portions of said hooks so as to prevent separation of the terminal links from said hooks.

3. The combination set forth in claim 1, and a removable abutment carried by at least one of the hook bill ends at the opposite side of the latter from the related stud and positioned to intercept the end of the link which adjoins the gap-defining link whereby to prevent movement of the gap-defining link onto the adjacent bill-carried stud.

4. The combination set forth in claim 1, and each stud and the adjacent hook bill at the side of the lug which is remote from the bill end providing thickened and merging outwardly tapering portions constituting a link seat in which the related terminal link engages in the event that the hooks bend under a predetermined excess load whereby the stud and hook bill-provided load sustaining capacity of the hooks at the site of said seats in the direction of load under such condition exceeds the load sustaining capacity of other portions of said hooks so as to prevent separation of the terminal links from said hooks, and a removable abutment carried by at least one of the hook bill ends at the opposite side of the latter from the related stud and positioned to intercept the end of the link which adjoins the gap-defining link, whereby to prevent movement of the gap-defining link onto the adjacent bill-carried stud.

References Cited in the file of this patent
UNITED STATES PATENTS

| D. 31,189 | Wheeler | July 11, 1899 |
| 263,245 | Thomas | Aug. 22, 1882 |
| 1,380,903 | Haughwout | June 7, 1921 |
| 1,646,135 | Black | Oct. 18, 1927 |
| 2,004,677 | Stowe | June 11, 1935 |
| 2,406,995 | Coates | Sept. 3, 1946 |

FOREIGN PATENTS

| 910,342 | France | June 4, 1946 |